(12) United States Patent
Shijo et al.

(10) Patent No.: US 11,616,363 B2
(45) Date of Patent: Mar. 28, 2023

(54) ELECTRONIC APPARATUS WITH DETECTION OF AN ISLANDING CONDITION

(71) Applicant: KABUSHIKI KAISHA TOSHIBA, Tokyo (JP)

(72) Inventors: Tetsu Shijo, Setagaya (JP); Hiroshi Uno, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 100 days.

(21) Appl. No.: 17/186,699

(22) Filed: Feb. 26, 2021

(65) Prior Publication Data

US 2022/0085607 A1 Mar. 17, 2022

(30) Foreign Application Priority Data

Sep. 11, 2020 (JP) .............................. JP2020-153222

(51) Int. Cl.
*H02J 3/38* (2006.01)
*H02J 3/00* (2006.01)
*H02H 7/26* (2006.01)

(52) U.S. Cl.
CPC ............. *H02J 3/0012* (2020.01); *H02H 7/26* (2013.01); *H02J 3/388* (2020.01); *H02J 2300/24* (2020.01); *H02J 2300/28* (2020.01)

(58) Field of Classification Search
CPC ...... H02J 3/388; H02J 3/0012; H02J 2300/24; H02J 2300/28; H02H 7/26
See application file for complete search history.

(56) References Cited

U.S. PATENT DOCUMENTS

| 7,138,728 B2 | 11/2006 | LeRow et al. |
| 8,655,499 B2 * | 2/2014 | Sackman .................. H02J 3/14 |
| | | 700/297 |
| 9,001,480 B2 * | 4/2015 | Sato ..................... H02M 1/4225 |
| | | 361/88 |

(Continued)

FOREIGN PATENT DOCUMENTS

| CN | 108565895 A * | 9/2018 |
| EP | 1 278 282 A1 | 1/2003 |

(Continued)

OTHER PUBLICATIONS

JEM 1505 "Standard active islanding detection scheme for three-phase low voltage utility-interactive power conditioners of photovoltaic power sources (A frequency feedback method with step injection of reactive power)", 2020, 50 pages (with English Machine Translation).

*Primary Examiner* — Harry R Behm
(74) *Attorney, Agent, or Firm* — Maier & Maier, PLLC (57) ABSTRACT

According to one embodiment, an electronic apparatus connectable to a partial power system which is a part of a power system and comprises a first power source apparatus, power supply of the first power source apparatus stopped in response to detecting an islanding of the partial power system, includes: controlling circuitry configured to output to the partial power system a first signal to disable detecting the islanding of the partial power system by the first power source apparatus during at least part of a period during which the partial power system is electrically separated from the power system.

14 Claims, 9 Drawing Sheets

(56) References Cited

U.S. PATENT DOCUMENTS

| | | | |
|---|---|---|---|
| 9,444,288 B2 | 9/2016 | Sato et al. | |
| 2014/0354234 A1* | 12/2014 | Sudan .................. | H02J 7/0063 307/18 |

FOREIGN PATENT DOCUMENTS

| | | | | |
|---|---|---|---|---|
| EP | 1278282 A1 * | 1/2003 | ................ | H02J 3/38 |
| EP | 2 980 980 A1 | 2/2016 | | |
| JP | 3028205 B2 | 4/2000 | | |
| JP | 2000-333373 A | 11/2000 | | |
| JP | 2002-199590 A | 7/2002 | | |
| JP | 2005-261070 A | 9/2005 | | |
| JP | 4094502 B2 | 6/2008 | | |
| JP | 4552913 B2 | 9/2010 | | |
| JP | 4618222 B2 | 1/2011 | | |
| JP | 4861239 B2 | 1/2012 | | |
| JP | 4889295 B2 | 3/2012 | | |
| JP | 5351945 B2 | 11/2013 | | |
| JP | 5362472 B2 | 12/2013 | | |
| JP | 5437707 B2 | 3/2014 | | |
| JP | 2014165954 A * | 9/2014 | | |
| JP | 5602176 B2 | 10/2014 | | |
| JP | 5609379 B2 | 10/2014 | | |
| JP | 2015220821 A * | 12/2015 | | |
| JP | 5848039 B2 | 1/2016 | | |
| JP | 5906403 B2 | 4/2016 | | |
| JP | 5961932 B2 | 8/2016 | | |
| JP | 6105705 B2 | 3/2017 | | |
| JP | 6134558 B2 | 5/2017 | | |
| JP | 2018-007320 A | 1/2018 | | |
| JP | 6284081 B2 | 2/2018 | | |
| JP | 6374213 B2 | 8/2018 | | |

\* cited by examiner

ELECTRONIC APPARATUS WITH DETECTION OF AN ISLANDING CONDITION

CROSS REFERENCE TO RELATED APPLICATIONS

This application is based upon and claims the benefit of priority from the prior Japanese Patent Application No. 2020-153222, filed on Sep. 11, 2020, the entire contents of which are incorporated herein by reference.

FIELD

Embodiments described herein relates to an electronic apparatus and a method.

BACKGROUND

When an accident or the like occurs in a power system, islanding without disconnecting power source devices from the power system may greatly affect human bodies and equipment. Thus, it is obligatory to take measures such as detecting the power source devices in islanding and disconnecting the detected power source devices from the power system.

As one of islanding detection schemes, there is an active scheme called "frequency feedback scheme with step injection." This scheme detects islanding of a power source device by abruptly injecting reactive power so as to further promote a frequency change of a power system from a frequency change rate of the power system and examining the frequency change.

On the other hand, after occurrence of a disaster, even when safety in a partial power system (microgrid) disconnected from the power system is confirmed, it may take time to confirm safety of the power system, and power supply from the power system may not be restarted. In this case, there may be a case where each power source device is desired to operate independently (islanding) while the device remains disconnected from the power system in the microgrid. However, there is a problem that operation of each power source device cannot be started due to an islanding detection function of the power source device. For this reason, it is not possible to supply power in the microgrid.

DETAILED DESCRIPTION

According to one embodiment, an electronic apparatus connectable to a partial power system which is a part of a power system and comprises a first power source apparatus, power supply of the first power source apparatus stopped in response to detecting an islanding of the partial power system, includes: controlling circuitry configured to output to the partial power system a first signal to disable detecting the islanding of the partial power system by the first power source apparatus during at least part of a period during which the partial power system is electrically separated from the power system.

Hereinafter, an embodiment of the present invention will be described with reference to the accompanying drawings.

Figure 1:
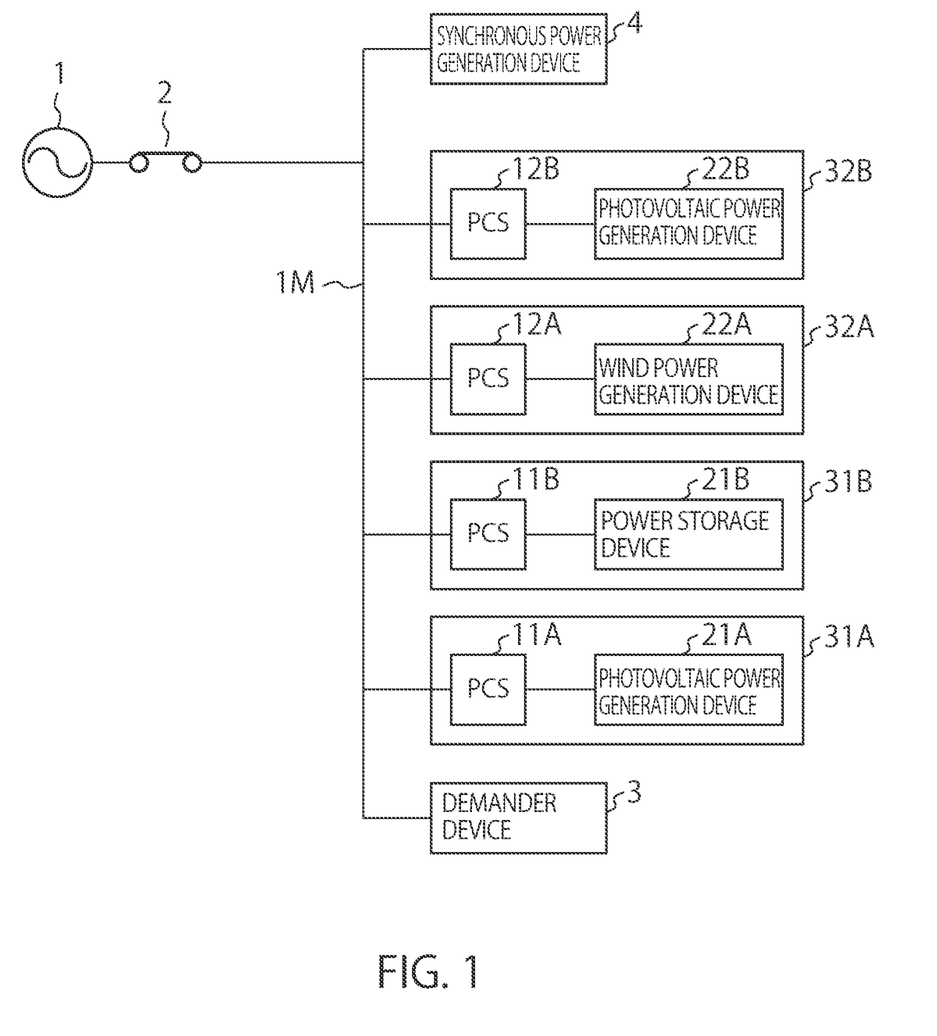
FIG. 1 is a diagram illustrating an overall configuration of a power system according to the present embodiment.

FIG. 1 is a diagram illustrating an overall configuration of a power system according to the present embodiment. Power source devices (power source apparatuses) 31A, 31B, 32A and 32B, a demander device 3 and a synchronous power generation device 4 are connected to a power system 1 via a circuit breaker 2. The power source devices 31A, 31B, 32A and 32B are provided with PCSs (power conditioning systems) 11A, 11B, 12A and 12B, which are power conversion devices, and power supply devices 21A, 21B, 22A and 22B, which are connected to the PCSs. More specifically, the power supply device 21A is a photovoltaic power generation device, the power supply device 21B is a power storage device, which is a chargeable/dischargeable secondary battery, the power supply device 22A is a wind power generation device, and the power supply device 22B is a photovoltaic power generation device. A partial power system of the power system 1 to which the power source devices 31A, 31B, 32A and 32B, the demander device 3 and the synchronous power generation device 4 are connected is a microgrid 1M. The microgrid 1M is a part of the power system 1.

The PCSs 11A, 11B, 12A and 12B are each an electronic apparatus configured to generate power to be used by the demander device 3 by converting power supplied from the photovoltaic power generation device 21A, the power storage device 21B, the wind power generation device 22A, and the photovoltaic power generation device 22B to AC respectively. The PCSs are also called inverters (power conversion devices). The PCSs 11A and 11B are PCSs according to the present embodiment (electronic apparatuses according to the present embodiment) and the PCSs 12A and 12B are general PCSs (existing PCSs). The demander device 3 is a load device that consumes power in a household, school, factory, business operator or the like or a power storage device that stores surplus power in the power system 1. Although only one demander device 3 is Illustrated in FIG. 1, there can be a plurality of demander devices 3.

In the event of an abnormality such as an accident occurring in the power system 1, or in case of emergency during work or emergency such as fire, the circuit breaker 2 is opened. In the event of a power outage or when the circuit breaker 2 is opened, the microgrid 1M is electrically separated (disconnected) from the power system 1 and in a state of no power supply. At this time, the microgrid 1M functions as a distributed power supply system configured to be operable independently using renewable energy from the power generation device and the power storage device.

The synchronous power generation device 4 is an AC power generator configured to generate AC power and provide the AC power to the power system 1 or the microgrid 1M. The synchronous power generation device 4 includes an emergency power generator, a normal power generator or both. The emergency power generator is, for example, an emergency diesel power generator. The emergency diesel power generator is not operated at a normal time, and when an abnormality or the like occurs in the power system 1, and the emergency diesel power generator is disconnected from the power system 1, the emergency diesel power generator starts operating under an instruction from an operator. The instruction from the operator may be given by a switch such as a button provided in the synchronous power generation device 4. Alternatively, the instruction from the operator may be given by transmitting a command signal wirelessly or by wire from a terminal available to the operator or from a terminal available to the supervisor of the control center. The terminal operable by the operator is, for example, a maintenance tablet terminal. The terminal operable by the supervisor is, for example, a server or the like that supervises the microgrid 1M on line or off line. A configuration not provided with any synchronous power generation device 4 is also possible. When the synchronous power generator is used as an emergency generator or a normal generator, a governor of the power generator may be used by switching between one with an isochronous characteristic and the other with a droop characteristic. The governor with the isochronous characteristic performs control such that the rotational speed of the power generator becomes constant regardless of the magnitude of a load connected. The governor with the droop characteristic performs control such that the rotational speed of the power generator varies depending on the magnitude of the load connected to share the load with the other synchronous power generators for load fluctuation or the like. The governor may be switched to the one with the droop characteristic at a normal time when the system works in tandem, and the governor may be switched to the other with the isochronous characteristic when used off-grid in case of an emergency or the like.

At a normal time, when no abnormality such as an accident occurs in the power system 1, the circuit breaker 2 is closed. When the circuit breaker 2 is closed, power is supplied from the photovoltaic power generation device 21A, the power storage device 21B, the wind power generation device 22A and the photovoltaic power generation device 22B to the power system 1 via the PCSs 11A, 11B, 12A and 12B connected respectively. The supplied power is supplied to the demander device 3. Power supplied from at least one of the photovoltaic power generation device 21A, the wind power generation device 22A and the photovoltaic power generation device 22B may be supplied to the power storage device 21B and stored. When an abnormality such as an accident occurs in the power system 1, or the like, the circuit breaker 2 is opened and the PCSs 11A, 11B, 12A and 12B or the like are connected to the microgrid 1M disconnected from the power system 1.

The PCSs 11A, 11B, 12A and 12B are each provided with a mechanism for detecting whether or not each own device is performing islanding. The islanding refers to each PCS (or power source device) operating without being disconnected from the power system 1 with no power supply from the power system 1. When islanding is performed, there is a possibility that human bodies or equipment may be greatly affected, and so the PCSs 11A, 11B, 12A and 12B are provided with a function of inspecting at all times whether or not the own device is performing islanding and disconnecting the own device from the power system 1 when islanding is detected. A process of detecting whether or not islanding is being performed is called an "islanding detection process."

Various mechanisms for detecting islanding are known and such mechanisms are roughly divided into a passive scheme and an active scheme. The passive scheme is a scheme for detecting a sudden change in a voltage phase or frequency due to imbalance between power generation output and load at the time of transition to islanding. Examples of generally known such schemes include voltage phase jump detection, three-dimensional harmonic voltage distortion steep rise detection and frequency change rate detection.

The active scheme is a scheme that gives a fluctuation at all times to a voltage or frequency using a resistor or the like added to a PCS control system or PCS exterior, and detects a fluctuation which becomes significant at the time of transition to islanding. The active scheme includes a conventional active scheme and a new active scheme. Examples of the conventional active scheme include a frequency shift scheme, a slip mode frequency shift scheme, an active power fluctuation scheme, reactive power fluctuation scheme, and a load fluctuation scheme. The new active scheme is a scheme obtained by increasing a detection speed of the islanding detection function of the conventional active scheme, and a frequency feedback scheme with step injection or the like is known.

A case is assumed in the present embodiment where a frequency feedback scheme with step injection is used as the islanding detection scheme. However, detecting islanding using other schemes is not excluded.

The frequency feedback scheme with step injection is a scheme for detecting PCS islanding by abruptly injecting reactive power (islanding detection signal) so as to further promote a frequency change of the power system 1 from a frequency change rate of the power system 1 and examining the frequency change. The islanding detection signal corresponds to a second signal for each PCS to promote a frequency change or a voltage change in the power system 1.

The PCSs 11A and 11B are PCSs according to the present embodiment, and the PCSs 12A and 12B are existing PCSs.

The islanding detection functions of the PCSs 12A and 12B are always in on state, whereas the islanding detection functions of the PCSs 11A and 11B are configured to be switchable between on and off states. The islanding detection functions of the PCSs 11A and 11B are set in on-state during normal operation when the circuit breaker 2 is closed.

Furthermore, the PCSs 11A and 11B according to the present embodiment are provided with a function of disabling the islanding detection functions of the PCSs 12A and 12B (existing-PCS-islanding disabling functions). The existing-PCS-islanding disabling function is a function (first function) of outputting a signal for canceling at least part of a change in frequency or voltage in the microgrid 1M for reactive power (islanding detection signal) outputted by the PCSs 12A and 12B for islanding detection. During normal operation when the circuit breaker 2 is closed, the existing-PCS-islanding disabling functions of the PCSs 11A and 11B are set to "disabled," and no process of disabling the islanding detection functions of the PCSs 12A and 12B is performed.

When the PCSs 11A, 11B, 12A and 12B detect islandings of the respective own devices using the islanding detection functions, the PCSs disconnect the own devices from the power system 1 and stop the respective operations. That is, AC power supply to the power system 1 or the microgrid 1M is stopped.

Figure 2:
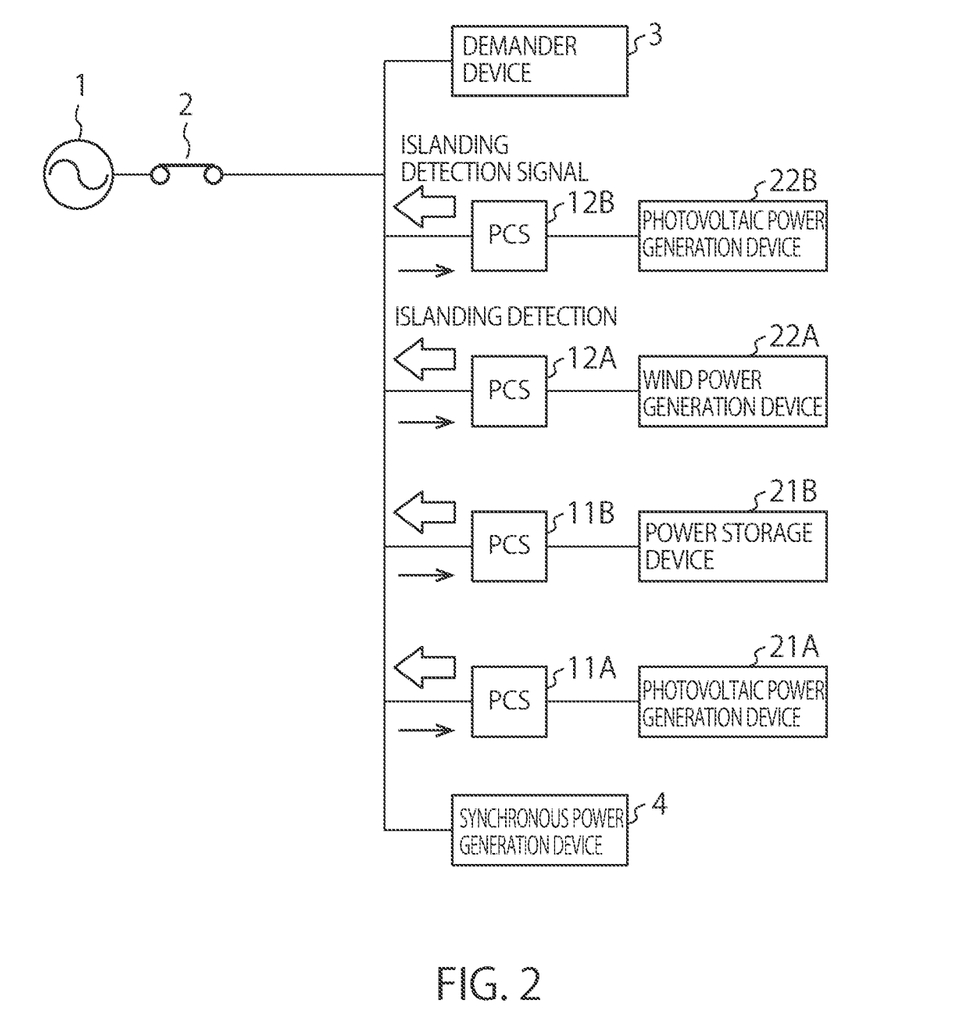
FIG. 2 is a diagram illustrating an example where each PCS outputs an islanding detection signal.

FIG. 2 illustrates an example where the PCSs 11A, 11B, 12A and 12B output reactive power (islanding detection signals) to the microgrid 1M. The PCSs 11A, 11B, 12A and 12B detect islanding of the own devices according to output of reactive power, which are islanding detection signals. The PCSs 11A, 11B, 12A and 12B from which islanding have been detected disconnect the own devices from the microgrid 1M. This causes the power in the microgrid 1M to go out. After that, for example, the circuit breaker 2 is opened and the microgrid 1M is disconnected from the power system 1.

In the present embodiment, after safety in the microgrid 1M disconnected from the power system 1 is confirmed, it is possible to start power supply in the microgrid 1M using the existing-PCS-islanding disabling function (first function) of the PCSs 11A and 11B.

Figure 3:
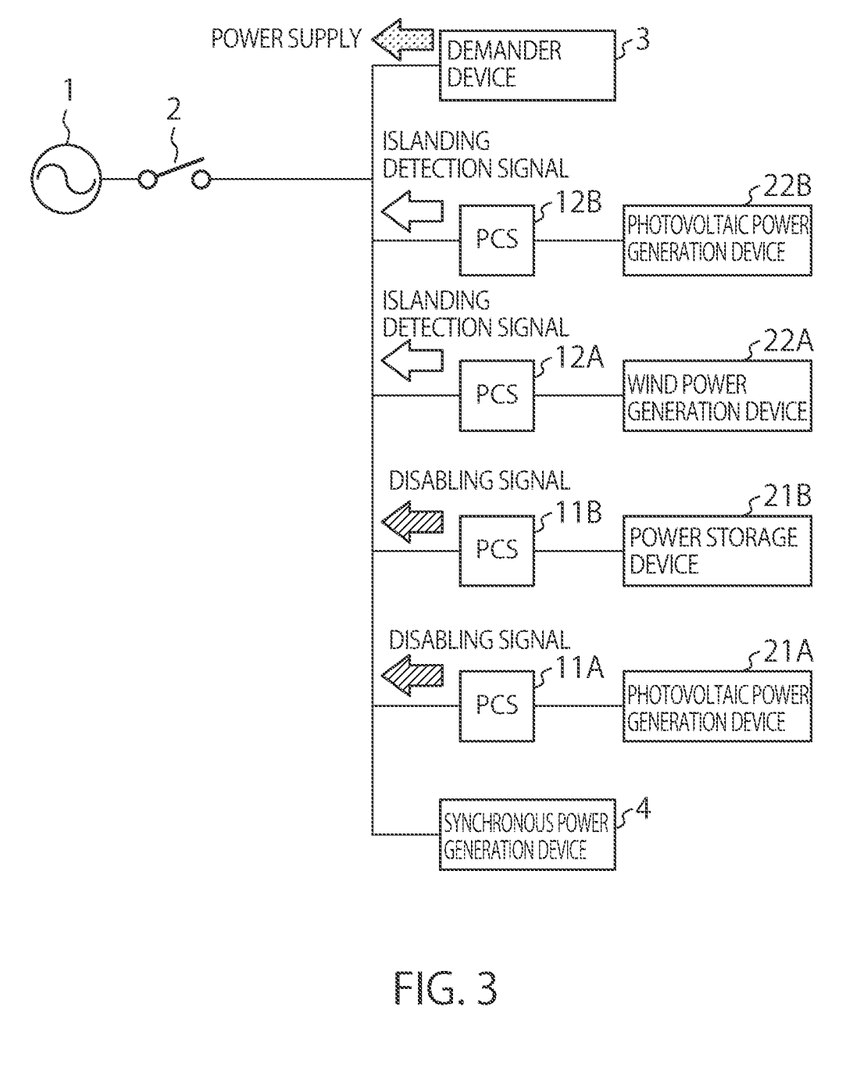
FIG. 3 is a diagram illustrating an example where power supply is started in a microgrid disconnected from the power system.

FIG. 3 illustrates an operation example of each PCS and the synchronous power generation device 4 when power supply is started in the microgrid 1M disconnected from the power system 1. First, according to an instruction of the operator, the synchronous power generation device 4 (here, the emergency power generator) starts operation and supplies AC power to the microgrid 1M.

Next, the PCSs 11A, 11B, 12A and 12B receive an instruction for restarting operation from the operator and restart the operation. The instruction from the operator may be given using a switch such as a button provided on each PCS. Alternatively, the instruction from the operator may also be given by transmitting a command signal wirelessly or by wire to the respective PCSs from a terminal available to the operator, or from a terminal available to the supervisor of the control center. At the time of restarting operation, in the PCSs 11A and 11B, the islanding detection functions of the own devices are set to "off" according to an instruction from the operator, and the existing-PCS-islanding disabling functions are set to "enabled."

After restarting the operation, the PCSs 12A and 12B supply power to the microgrid 1M in the same way as before the disconnection, whereas the PCSs 12A and 12B output the islanding detection signals (reactive power) to the microgrid 1M. In this case, the existing-PCS-Islanding disabling functions provided for the PCSs 11A and 11B according to the present embodiment are enabled. This causes a disabling signal (reactive power or active power or reactive power and active power) that at least partially cancels a frequency change promoted by islanding detection signals (reactive power) outputted to the microgrid 1M by the PCSs 12A and 12B to be outputted from the PCSs 11A and 11B to the microgrid 1M. The canceling signal corresponds to a first signal for disabling an islanding detection process by the PCSs 12A and 12B. An example of the disabling signal is reactive power or active power. This causes the PCSs 12A and 12B not to detect a frequency change necessary to detect islanding in the microgrid 1M and not to detect islanding of the own devices. This disables the islanding detection process in the PCSs 12A and 12B. Thus, the PCSs 12A and 12B are not disconnected from the microgrid 1M and can supply power. Since the present embodiment uses the frequency feedback scheme with step injection, a signal for canceling a frequency change is outputted, but it is only necessary to generate an appropriate signal according to the detection scheme used as appropriate. In the case of a scheme for detecting a voltage change, a signal for canceling a voltage change may be outputted as the disabling signal.

The PCSs 11A and 11B output the above-described disabling signals while supplying power to the microgrid 1M. Since the islanding detection functions of the PCSs 11A and 11B are set to "off," operation for detecting islanding of the own device is not performed and it is thereby possible to supply power to the microgrid 1M.

In this way, in the present embodiment, even when disconnected from the power system 1 (the circuit breaker 2 is opened), it is possible to supply power in the microgrid 1M. That is, even when there is no power supply from the power system 1, it is possible to supply power in the microgrid 1M.

In the present embodiment, the synchronous power generation device 4 (here, emergency power generator) is operated first and operations of the PCSs 11A, 11B, 12A and 12B are then restarted, but a configuration of not allowing the synchronous power generation device 4 to operate is also possible.

Figure 4:
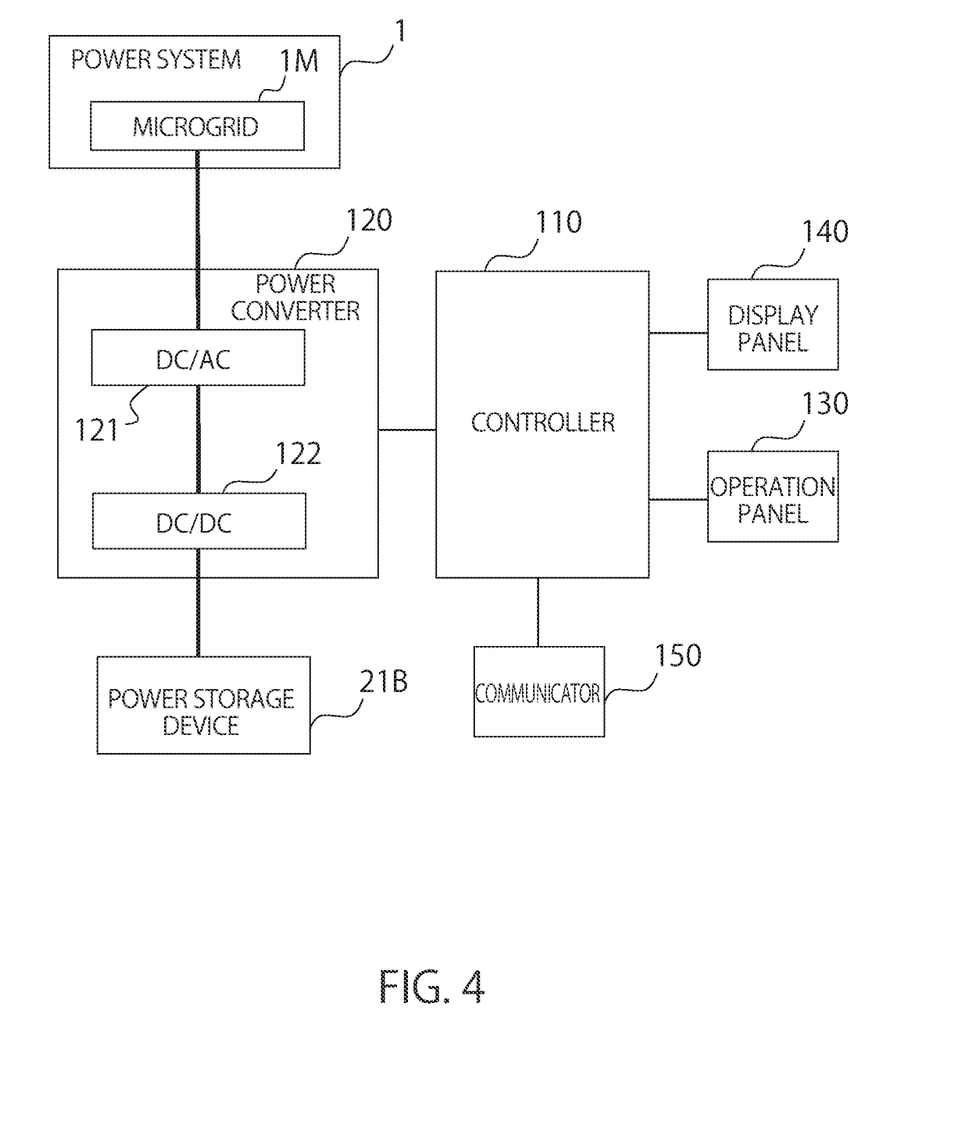
FIG. 4 is a block diagram of a PCS according to the present embodiment.

FIG. 4 is a block diagram of the PCS 11A according to the present embodiment.

Figure 5:
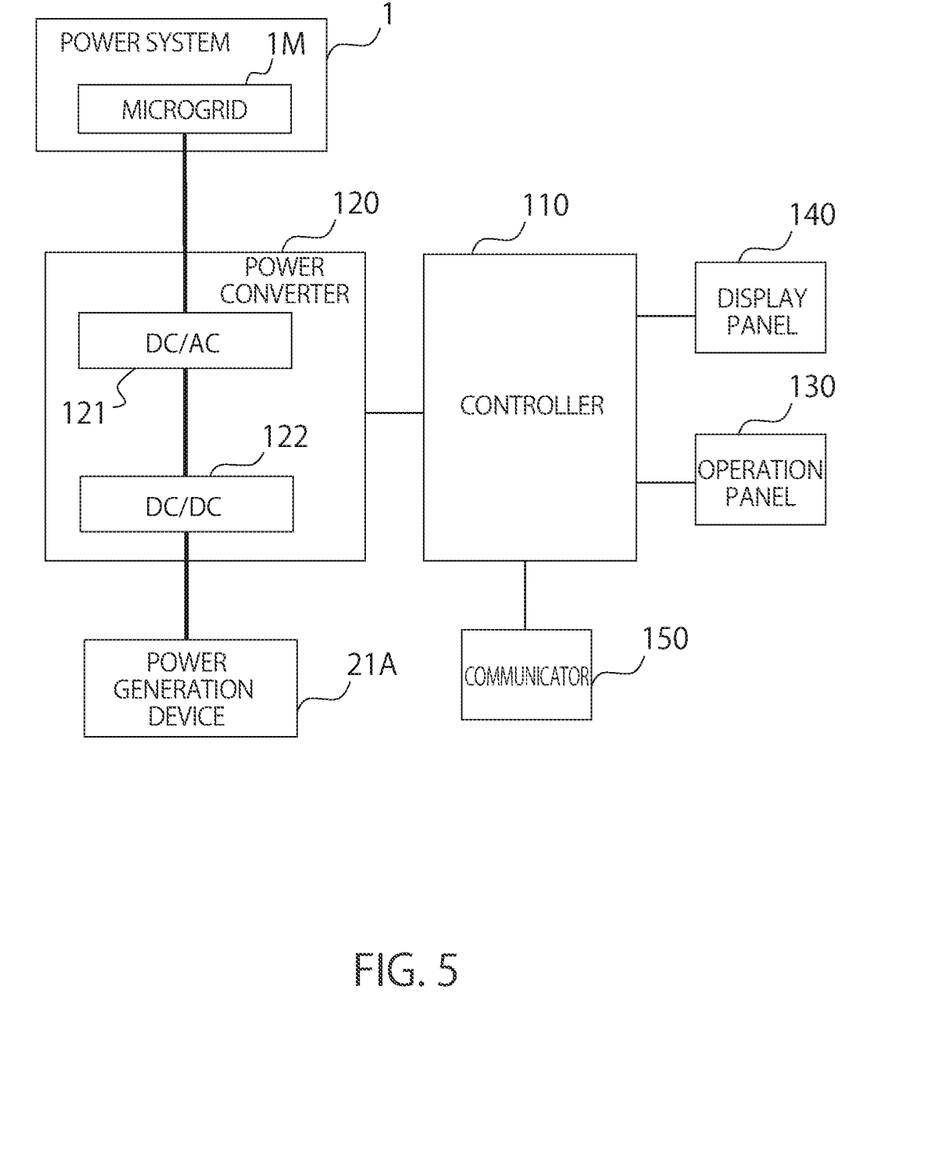
FIG. 5 is a block diagram of another PCS according to the present embodiment.

FIG. 5 is a block diagram of the PCS 11B according to the present embodiment.

The configurations of the PCS 11A in FIG. 4 and the PCS 11B in FIG. 5 are only different in the power supply device connected (power storage device or power generation device) and the remaining blocks are the same. For this reason, blocks having the same names in FIG. 4 and FIG. 5 are assigned the same reference numerals and only FIG. 4 will be described hereinafter. Since the same description in FIG. 4 is applicable to FIG. 5, description thereof will be omitted.

The PCS 11A in FIG. 4 is provided with a controller 110 (controlling circuitry), a power converter 120 and a communicator 150. The controller 110 is connected to an operation panel 130 and a display panel 140. The power converter 120 is provided with a DC/AC 121 and a DC/DC 122. The controller 110, the power converter 120 and the communicator 150 are configured of an analog circuit, a digital circuit or both circuits. Part or all of the controller 110 and the power converter 120 may also be implemented by causing a processor such as a CPU or a microcomputer to execute a computer program stored in a memory.

A DC/DC 122 of the power converter 120 performs a DC-DC conversion of a DC voltage of power supplied from the power storage device 21B. The DC/AC 121 converts the DC-DC converted power of DC voltage to AC power available to the demander device 3. The power converter 120 outputs the converted AC power to the microgrid 1M or the power system 1. Under the controller 110, the power converter 120 is configured to be able to output reactive power or active power or reactive power and active power as an islanding detection signal of the own device. Under the control of the controller 110, the power converter 120 is configured to be able to output reactive power or active power or reactive power and active power as a disabling signal to disable an islanding detection function of the existing PCS.

The communicator 150 communicates with a terminal operable by the operator or a terminal operable by the supervisor of the control center. Communication may be wireless communication such as wireless LAN, mobile network communication or Bluetooth, or wired communication such as Ethernet or serial communication. The communicator 150 may also communicate with at least one of the other PCSs 11B, 12A and 12B, the demander device 3 and the synchronous power generation device 4.

The display panel 140 displays an enabled or disabled state of the existing-PCS-islanding detection function and displays an on or off state of the islanding detection function of the own device. The display panel 140 is provided, for example, in an external housing of the PCS 11A and can be visually checked by the operator.

Figure 6:
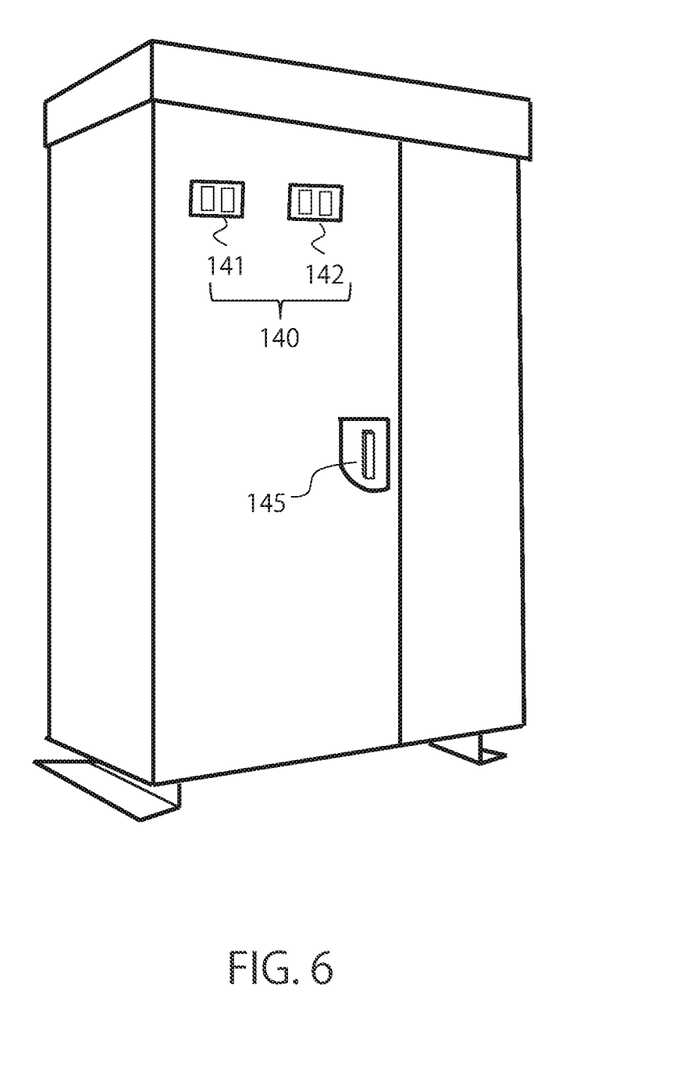
FIG. 6 is a diagram illustrating an example of appearance of the PCS.

FIG. 6 illustrates an example of appearance of the PCS 11A. The display panel 140 is provided on the external housing of the PCS 11A. The operator pinches a handle 145 to open the door and can thereby enter inside the housing. Devices such as the power converter 120 are disposed in the housing. Light emitters 141 and 142 are provided on the display panel 140 outside the housing. The light emitter 141 emits light of a color representing an enabled or disabled state of the existing-PCS-islanding disabling function. The light emitter 142 emits light of a color representing an on or off state of the islanding detection function of the own device.

The light emitter 141 includes multi-color light-emitting diodes (LEDs) or lamps and causes different LEDs to emit light according to an enabled or disabled state of the existing-PCS-islanding disabling function. The light emitter 141 includes multi-color light-emitting diodes and causes different LEDs to emit light according to an on or off state of the islanding detection function of the own device. This allows the operator to easily confirm a state of each function from outside the PCS housing.

Display devices such as a liquid crystal display device or organic EL display device may be used instead of the light emitters 141 and 142. In the case of a liquid crystal display device or the like, information indicating a state may be displayed using text or image or the like. The controller 110 is provided with an output device that outputs an enabled or disabled state of the existing-PCS-islanding disabling function or an on or off state of the islanding detection function to the display panel 140.

An enabled or disabled state of the existing-PCS-islanding detection function or an on or off state of the islanding detection function may also be displayed on a terminal operable by the operator or a terminal operable by the supervisor of the control center. In this case, the controller 110 transmits information indicating an enabled or disabled state of the existing-PCS-islanding detection function or an on or off state of the islanding detection function to the terminal via the communicator 150. The terminal displays the received information on a screen. The communicator 150 is an example of an output device configured to output an enabled or disabled state of the existing-PCS-islanding detection function or an on or off state of the islanding function.

Figure 7:
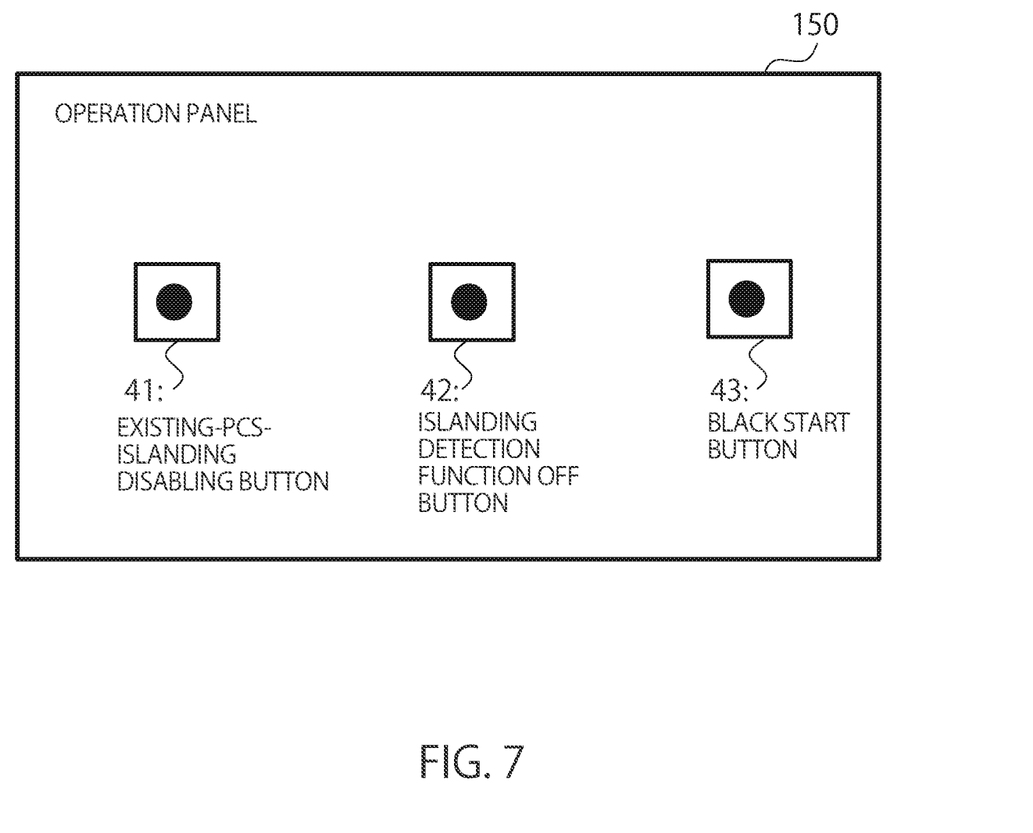
FIG. 7 is a diagram illustrating an example of appearance of an operation panel.

The operation panel 130 is intended to perform operation of switching an enabled or disabled setting of the existing-PCS-islanding disabling function and operation of switching an on or off setting of the islanding detection function, or the like.

FIG. 7 illustrates an example of appearance of the operation panel 130. The operation panel 130 is disposed, for example, in the housing of the PCS 11A (e.g., in the housing shown in FIG. 6). The operator can open the door of the housing to operate the operation panel 130.

The operation panel 130 is provided with an existing-PCS-Islanding disabling button 41, an islanding detection function off button 42 and a black start button 43. The existing-PCS-islanding disabling button 41 is a button configured to switch an enabled or disabled state of the existing-PCS-islanding disabling function. The islanding detection function off button 42 is a button configured to switch an on or off state of the islanding detection function of the own device. After the PCS 11A is disconnected from the power system 1, the black start button 43 is a button configured to restart operation of the PCS 11A disconnected from the power system 1.

A command signal by each button on the operation panel 130 is transmitted to the controller 110. The controller 110 controls operation of the power converter 120 based on the command signal by each button.

When the existing-PCS-Islanding disabling function is enabled by the existing-PCS-islanding disabling button 41, the controller 110 performs a process of disabling the islanding detection function of the existing PCS. That is, when reactive power is inputted from the existing PCS 12A or 12B as an islanding detection signal, the controller 110 estimates the reactive power from a voltage and a frequency of the microgrid 1M. The controller 110 generates a disabling signal to cancel a frequency change (to prevent a frequency change) in the microgrid 1M by the inputted reactive power and outputs the generated disabling signal to the microgrid 1M. As an example of the disabling signal, the controller 110 generates reactive power or active power or reactive power and active power. This causes the existing PCSs 12A and 12B not to further detect islanding, and can thereby disable the islanding detection functions of the existing PCSs 12A and 12B and cause the PCSs 12A and 12B to perform autonomous operation. The existing-PCS-Islanding disabling function is disabled at normal times. The present function is enabled only when the existing PCS is made to perform autonomous operation at the time of off-grid such as in the event of a disaster. In this way, the controller 110 outputs a disabling signal (first signal) for disabling an islanding detection process by the existing PCS connected to the power system 1 to the microgrid 1M for at least part of the period during which the power system 1 is disconnected.

The existing-PCS-islanding disabling button 41 is an example of the switch for switching an enabled or disabled state of the existing-PCS-Islanding disabling function. A switchable configuration may also be implemented using a hard switch provided for the PCS, a switch displayed on a touch panel operable by each PCS, or a switch of a maintenance device. Alternatively, an enabled or disabled state of the existing-PCS-islanding disabling function may be switched by updating a program to be executed by the controller 110 using a maintenance terminal (personal computer or the like). That is, the program includes a code to set an enabled or disabled state of the function and the code is configured to be rewritable. The operator updates the code so as to be set in an enabled state when the operator wants to enable the function, writes the updated program from the terminal to the controller 110 and causes the controller 110 to execute the program.

When the islanding detection function of the own device is "on," the controller 110 outputs reactive power as an islanding detection signal according to the frequency feedback scheme with step injection and detects the presence or absence of the islanding. During normal operation, the islanding detection function is set to "on." When the islanding detection function is set to "off" by the islanding detection function off button 42, for example, in the event of an abnormality occurring in the power system 1, the controller 110 does not output any islanding detection signal. This allows the PCSs 11A and 11B to perform autonomous operation at the time of off-grid and supply power to the microgrid 1M.

Upon detecting islanding of the own device, the controller 110 disconnects the own device from the power system 1 and stops operation. This is an example of control by the controller 110 for stopping at least part of the microgrid 1M (partial power system). When there is an operation input of an instruction for restarting operation (starting islanding) by the black start button 43 after stopping operation of the own device, the controller 110 performs control for causing at least part of the microgrid 1M to perform islanding. The controller 110 causes the own device to restart operation. The controller 110 outputs a first signal (disabling signal) for disabling detection of islanding by another power source device to the microgrid 1M.

During operation, the controller 110 controls the power converter 120 so as to generate AC power to be supplied to the demander device 3. That is, the controller 110 controls the power converter 120 to supply AC power to the power system 1 or the microgrid 1M regardless of the enabled or disabled state of the existing-PCS-islanding detection function or the on or off state of the islanding detection function.

The controller 110 may include a storage to store various kinds of information or data. The storage stores information indicating an enabled or disabled state of the existing-PCS-islanding detection function or information indicating an on or off state of the islanding detection function, or the like. The storage also stores various kinds of parameter information necessary to control the power converter 120. When the controller 110 executes a program, the program is stored in the storage. The storage includes at least one or more storage media such as a volatile memory, non-volatile memory, hard disk or SSD.

Figure 8:
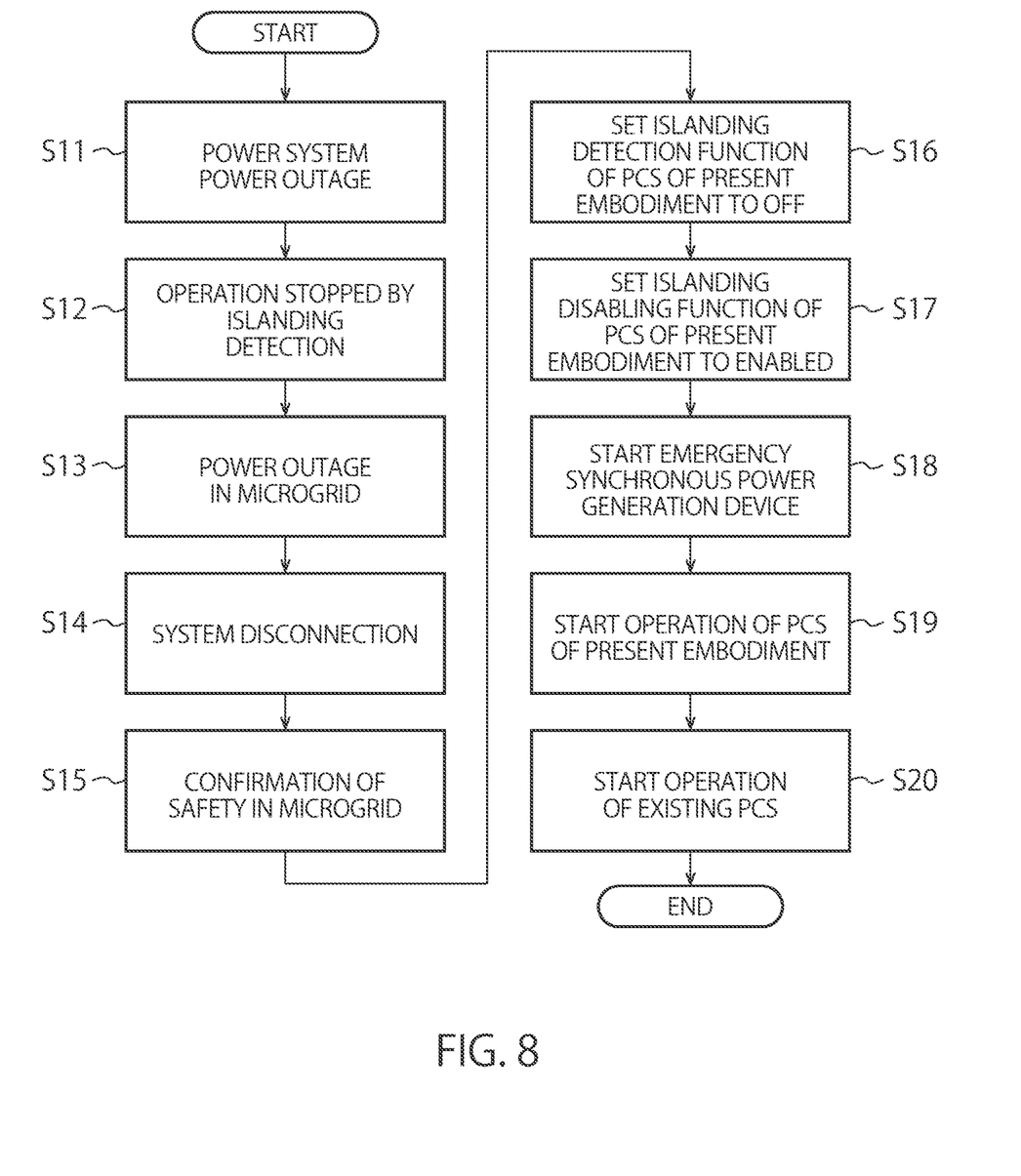
FIG. 8 is a flowchart of a series of operations when power is supplied in an off-grid microgrid.

FIG. 8 is a flowchart of a series of operations when power is supplied in the microgrid 1M at the time of off-grid in the event of an abnormality in the power system 1 in the present embodiment. First, a power outage occurs in the power system 1 (S11). The PCSs 11A, 11B, 12A and 12B detect islanding of the respective own devices and stop operation (S12). This causes the inside of the microgrid 1M to be placed in a state in which power is no longer supplied (power outage) (S13). Maintenance staff of the power system 1 opens the circuit breaker 2 of the power system 1 (S14). Note that the circuit breaker 2 may also be opened by automatic control according to the state of the power system 1.

After safety in the microgrid 1M is confirmed (S15), the operator turns on the islanding detection function off buttons 42 of the PCSs 11A and 11B (S16). That is, the islanding detection function is turned off. The operator enables the existing-PCS-islanding disabling functions of the PCSs 11A and 11B (S17). That is, the operator enables the function of disabling the islanding detection functions of the existing PCSs 12A and 12B (first function). The operator starts the emergency power generator included in the synchronous power generation device 4. The synchronous power generator used as a normal power generator may be switched by a governor switch from a mode having a droop characteristic to a mode having an isochronous characteristic and may be started as an emergency power generator. In the event of an abnormality, when a PCS is operated in parallel with another PCS, the PCS may be started with a droop characteristic (in a normal power generator mode) from the standpoint of load sharing (S18). The operator turns on the black start button 43 to restart the operations of the PCSs 11A and 11B (S19). Next, the operator restarts the operations of the PCSs 12A and 12B (S20).

Figure 9:
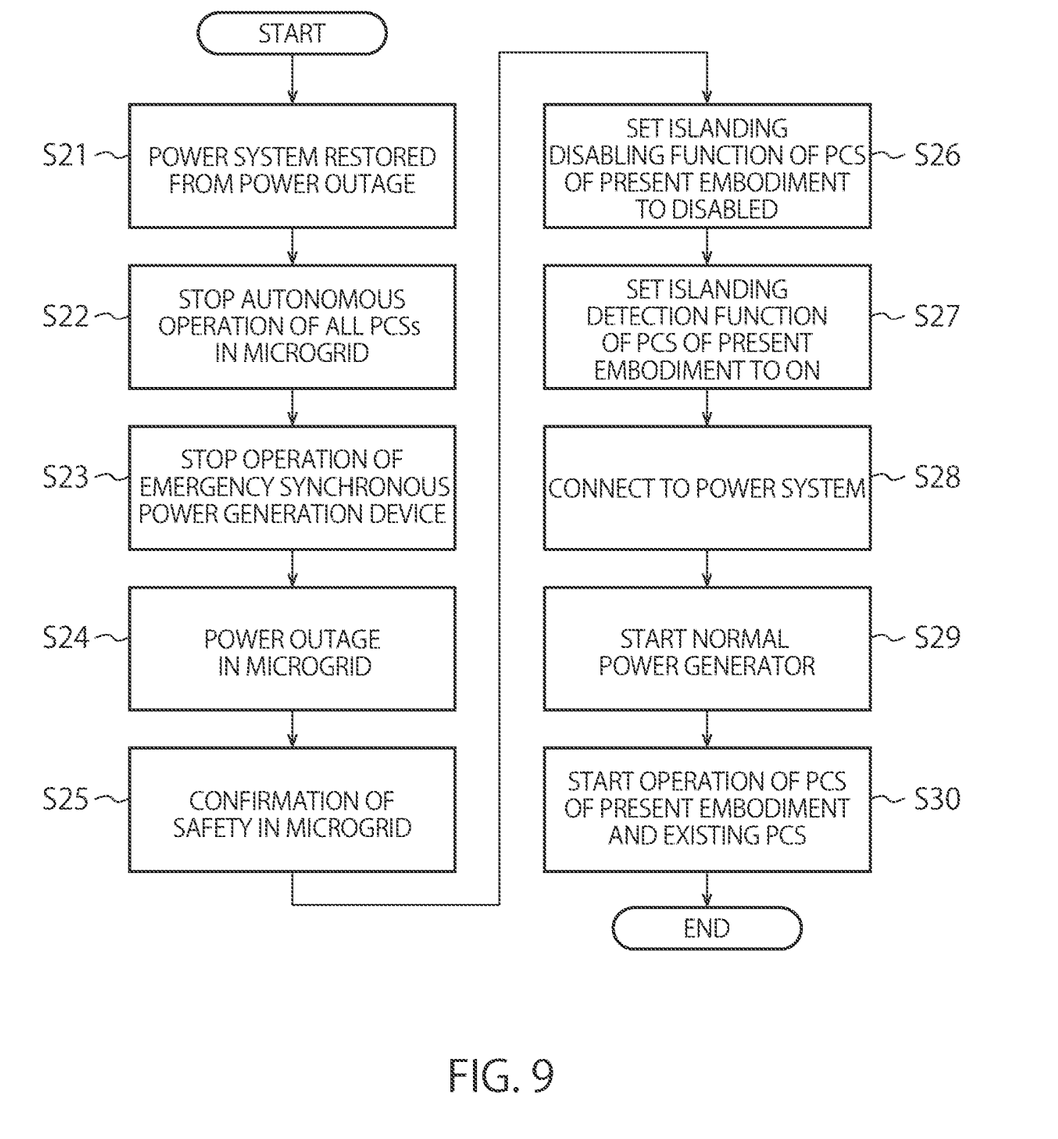
FIG. 9 is a flowchart of a series of operations to restore the microgrid to on-grid when the power system is restored from a power outage.

FIG. 9 is a flowchart of a series of operations to connect the microgrid 1M to the power system 1 and restore the microgrid 1M to an on-grid state when the power system 1 of the present embodiment is restored from a power outage. The power system 1 is restored from the power outage (S21). Note that the circuit breaker 2 is opened at this point in time. Autonomous operations of all the PCSs 11A, 11B, 12A and 12B in the microgrid 1M are stopped through operation by the operator (S22). Operation of the emergency power generator is stopped through operation by the operator (S23). This causes the power in the microgrid 1M to go out (S24). When safety in the microgrid 1M is confirmed (S25), the operator operates the existing-PCS-Islanding disabling button 41 to set the existing-PCS-islanding disabling functions of the PCSs 11A and 11B to a disabled state (S26). The operator operates the islanding detection function off button 42 to turn on the islanding detection functions of the PCSs 11A and 11B (S27). The maintenance staff of the power system 1 closes the circuit breaker 2 (S28). The normal power generator included in the synchronous power generation device 4 is started. When the emergency power generator is operated with an isochronous characteristic, the characteristic may be returned to a droop characteristic and the mode may be switched to a normal power generator mode (S29). The operations of the PCSs 11A, 11B, 12A and 12B is started through operation by the operator (S30). In this case, the operator may turn off the black start buttons 43 of the PCSs 11A and 12B. After the microgrid 1M is restored to an on-grid state, when the operation is stabilized, the normal power generator included in the synchronous power generation device 4 may be stopped.

As shown in FIG. 2 or FIG. 3, the power supply device (photovoltaic power generation device 21A or power storage device 21B) is connected to the electronic apparatus 11A and 11B according to the present embodiment, but a configuration with no power supply device connected is also possible. That is, an electronic apparatus may be configured as a device to implement operation of disabling the islanding detection functions of the existing PCSs 12A and 12B at the time of off-grid.

Although a case has been described in the present embodiment where any one of the PCSs 11A and 11B outputs the above-described disabling signal, when there are two or more PCSs according to the present embodiment, only at least one of the PCSs may be configured to output a disabling signal.

As described so far, according to the present embodiment, disabling signals for at least partially canceling a frequency change by islanding detection signals (reactive power) outputted by the PCSs 12A and 12B are outputted from the PCSs 11A and 11B. This causes the PCSs 12A and 12B not to further detect islanding of the own devices. That is, the islanding detection functions of the PCSs 12A and 12B are disabled. It is thereby possible to supply power inside of the microgrid 1M disconnected from the power system 1 and implement a disaster-resistant microgrid in the event of a disaster or the like. When, for example, the microgrid 1M is operated off-grid, when the capacity of the emergency power generator is small, the islanding detection functions of the PCSs 12A and 12B may detect islanding and stop operations of the PCSs 12A and 12B. However, the PCSs 11A and 11B of the present embodiment may disable the islanding detection functions of the PCSs 12A and 12B, and can thereby avoid the occurrence of this problem.

(Modification)

In the aforementioned embodiment, the existing PCSs 12A and 12B output islanding detection signals and the PCSs 11A and 11B according to the present embodiment output disabling signals to at least partially cancel a frequency change promoted by the islanding detection signals. The islanding detection process of the existing PCSs 12A and 12B is thereby disabled.

In the present modification, upon detecting a predetermined signal (third signal) from the power system 1, the existing PCSs 12A and 12B are configured to wait for an islanding detection process. That is, upon detecting a predetermined signal, the existing PCSs 12A and 12B wait for an output of the islanding detection signal for a predetermined time period. Unless the signal is received again during the predetermined standby time period, the existing PCSs 12A and 12B output islanding detection signals after a lapse of the predetermined time. When the signal is received again during the predetermined time, the standby time is extended. When the existing PCSs 12A and 12B detect a power flicker as an example of the predetermined signal, the existing PCSs 12A and 12B wait for the islanding detection process for the predetermined time.

The PCSs 11A and 11B according to the present modification output the predetermined signal (third signal) as the disabling signal of the aforementioned embodiment. The PCSs 11A and 11B periodically output the predetermined signal to the microgrid 1M for a period during which the islanding detection process needs to be disabled. As an example, a configuration is considered in which when the existing PCSs 12A and 12B detect a power flicker, the PCSs 12A and 12B wait for an islanding detection process. In this case, in order to disable the islanding detection functions of the existing PCSs 12A and 12B, the PCSs 11A and 11B generate a power flicker and output the power flicker to the microgrid 1M. It is thereby possible to prevent the existing PCSs from executing the islanding detection process beforehand, and cause the existing PCSs 12A and 12B to perform autonomous operation. In this way, causing the PCSs to wait for the execution of an islanding detection process (waiting for an islanding detection signal to be outputted) is also one aspect of the method of disabling an islanding detection process.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An electronic apparatus connectable to a partial power system which is a part of a power system and comprises a first power source apparatus, power supply of the first power source apparatus stopped in response to detecting an islanding of the partial power system, comprising:
controlling circuitry configured to output to the partial power system a first signal to disable detecting the islanding of the partial power system by the first power source apparatus during at least part of a period during which the partial power system is electrically separated from the power system, wherein
the islanding of the partial power system is detected through outputting a second signal to the partial power system to promote change of a frequency or a voltage in the partial power system by the first power source apparatus, and
the first signal is a signal to cancel at least part of the change of the frequency or the voltage caused by the second signal.

2. The electronic apparatus according to claim 1, wherein the second signal is any one of (1) reactive power, (2) active power and (3) both reactive power and active power.

3. The electronic apparatus according to claim 1, wherein the controlling circuitry is able to switch between an enabled state or a disabled state of a first function that outputs the first signal to the partial power system.

4. The electronic apparatus according to claim 3, wherein the controlling circuitry is configured to enable the first function for at least part of a period during which the partial power system is electrically separated from the power system.

5. The electronic apparatus according to claim 4, wherein the controlling circuitry is configured to enable the first function after a power generation device connected to the partial power system starts to operate for the period during which the partial power system is electrically separated from the power system.

6. The electronic apparatus according to claim 3, comprising an output device configured to output information indicating whether the first function is enabled or disabled.

7. The electronic apparatus according to claim 3, wherein
the controlling circuitry executes a program,
the program comprises a code to set the first function to enabled or disabled,
the code is rewritable, and
the controlling circuitry sets the first function to enabled or disabled by executing the program.

8. The electronic apparatus according to claim 3, wherein
the controlling circuitry is configured to cause that the electronic apparatus detects the islanding, and
the controlling circuitry does not cause that the electronic apparatus detects the islanding for at least part of the period during which the partial power system is electrically separated from the power system and during which the first function is enabled.

9. The electronic apparatus according to claim 1, wherein
the electronic apparatus is connectable to a power supply device configured to supply power, and
the electronic apparatus comprises a power converter configured to convert the power supplied from the power supply device and output the converted power to the partial power system.

10. The electronic apparatus according to claim 9, wherein
the power supply device is a storage battery.

11. The electronic apparatus according to claim 9, wherein
the power supply device is a photovoltaic power generation device or a wind power generation device.

12. The electronic apparatus according to claim 1, wherein
upon detecting a third signal from the partial power system, the first power source apparatus is configured to wait for detecting the islanding, and
the controlling circuitry is configured to output the third signal as the first signal.

13. An electronic apparatus connectable to a partial power system which is a part of a power system and comprises a first power source apparatus, power supply of the first power source apparatus stopped in response to detecting an islanding of the partial power system, comprising:
controlling circuitry configured to output to the partial power system a first signal to disable detecting the islanding of the partial power system by the first power source apparatus during at least part of a period during which the partial power system is electrically separated from the power system, wherein the first signal is any one of (1) reactive power, (2) active power and (3) both reactive power and active power.

14. A method performed by an electronic apparatus connectable to a partial power system which is a part of a power system, comprises a first power source apparatus, power supply of the first power source apparatus stopped in response to detecting an islanding of the partial power system, comprising:

outputting to the partial power system a first signal to disable detecting the islanding of the partial power system by the first power source apparatus during at least part of a period during which the partial power system is electrically separated from the power system, wherein the islanding of the partial power system is detected through outputting a second signal to the partial power system to promote change of a frequency or a voltage in the partial power system by the first power source apparatus, and the first signal is a signal to cancel at least part of the change of the frequency or the voltage caused by the second signal.

* * * * *